(12) United States Patent
Muthaiah et al.

(10) Patent No.: US 11,149,654 B2
(45) Date of Patent: Oct. 19, 2021

(54) SYSTEMS, PROGRAM PRODUCTS, AND METHODS FOR ADJUSTING OPERATING LIMIT (OL) THRESHOLD FOR COMPRESSORS OF GAS TURBINE SYSTEMS BASED ON MASS FLOW LOSS

(71) Applicant: General Electric Company, Schenectady, NY (US)

(72) Inventors: Veerappan Muthaiah, Bangalore (IN); Ajay Keshava Rao, Bangalore (IN); Timothy Andrew Healy, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 120 days.

(21) Appl. No.: 16/809,150

(22) Filed: Mar. 4, 2020

(65) Prior Publication Data
US 2021/0277833 A1    Sep. 9, 2021

(51) Int. Cl.
*F02C 9/20*    (2006.01)

(52) U.S. Cl.
CPC ............ *F02C 9/20* (2013.01); *F05D 2220/32* (2013.01); *F05D 2260/83* (2013.01); *F05D 2270/301* (2013.01); *F05D 2270/303* (2013.01)

(58) Field of Classification Search
CPC .... F01D 25/007; F01D 21/10; F04D 27/0246; F02C 9/28; F02C 7/30; G05B 23/0254; F05D 2220/32; F05D 2260/83; F05D 2270/301; F05D 2270/303
See application file for complete search history.

(56) References Cited

U.S. PATENT DOCUMENTS

| | | | |
|---|---|---|---|
| 6,364,602 B1 | 4/2002 | Andrew et al. | |
| 6,535,824 B1 | 3/2003 | Mansky et al. | |
| 8,826,670 B2 * | 9/2014 | Hoffmann | F02C 9/22 60/773 |

(Continued)

FOREIGN PATENT DOCUMENTS

JP    5550790 B2    7/2014

OTHER PUBLICATIONS

EpSearch Report issued in connection with corresponding EP Application No. 21158000.6-1007, dated Jul. 13, 2021, 9 pages.

*Primary Examiner* — Igor Kershteyn
(74) *Attorney, Agent, or Firm* — James Pemrick; Hoffman Warnick LLC (57) ABSTRACT

Systems, program products, and methods for adjusting operating limit (OL) thresholds for compressors of gas turbine systems based on mass flow loss are disclosed herein. The systems may include at least one computing device in communication with the gas turbine system, sensor(s) measuring operational characteristic(s) of the gas turbine system, and a pressure sensor measuring an ambient fluid pressure surrounding the gas turbine system. The computing device(s) may be configured to adjust operational parameters of the gas turbine system by performing processes including determining a mass flow loss between an estimated, first mass flow rate and a calculated, second mass flow rate for the compressor of the gas turbine system, and adjusting an OL threshold for the compressor of the gas turbine system based on the mass flow loss. The OL threshold for the compressor may be below a predetermined surge threshold for the compressor.

20 Claims, 5 Drawing Sheets

(56) References Cited

U.S. PATENT DOCUMENTS

| | | |
|---|---|---|
| 2010/0089067 A1 | 4/2010 | Wilkes et al. |
| 2014/0093350 A1 | 4/2014 | Meisner et al. |
| 2014/0297053 A1 | 10/2014 | Morgan et al. |
| 2016/0377000 A1* | 12/2016 | Burkhardt ................. F02C 9/26 60/772 |
| 2020/0072130 A1* | 3/2020 | Smith ....................... F02C 9/00 |

* cited by examiner

SYSTEMS, PROGRAM PRODUCTS, AND METHODS FOR ADJUSTING OPERATING LIMIT (OL) THRESHOLD FOR COMPRESSORS OF GAS TURBINE SYSTEMS BASED ON MASS FLOW LOSS

BACKGROUND

The disclosure relates generally to gas turbine systems, and more particularly, to systems, program products, and methods for adjusting an operating limit (OL) threshold for a compressor of the gas turbine systems based on a mass flow loss for the compressor.

In conventional power systems, the operational efficiencies and potential undesirable events of each component affect the overall operations for the entire system. For example, a compressor of a gas turbine system collects, initially compresses, and directs an airflow, e.g., toward a rotating portion of the compressor. A pressure ratio for the compressor may determine how efficient the compressor operates. However, when the pressure ratio reaches a determined threshold or peak value, often referred to as an operational surge line, airflow instability may manifest reducing or potentially reversing the compressor airflow. Compressor surge (or stall) is when the fluid flow separates from the blades/nozzles within the compressor, reducing the effective area which reduces the passable airflow. In the extreme, the direction of the fluid flowing through the compressor may actually reverses direction. When surge occurs, the compressor no longer is compressing and providing fluid to the remaining portions of the gas turbine system, which in turn results in a loss of power generation. As operational time increases, the risk of surge increases and/or the surge line for the compressor decreases due to a number of factors. These factors may include compressor flow loss due to fouling (e.g., accumulation of dirt on the compressor airfoils), erosion (e.g., loss of airfoil surface material), and/or rubbing (e.g., contact between rotating compressor blades and the compressor case).

The surge line may be determined or calculated based on the pressure ratio within the compressor, as well as a mass flow rate for the fluid flowing through and utilized with the compressor. While the pressure ratio may be easily detected for a compressor, the mass flow rate for the fluid within the compressor is often difficult to accurately measure. Because the mass flow rate cannot be accurately detected, operators of gas turbine systems "overprotect" the new & clean compressors in order to ensure appropriate protection of the fully degraded compressor For example, conventional control systems for gas turbine systems operate the compressor at a much lower pressure ratio, and in turn a lower operational efficiency. Specifically when controlling the operation of the compressor, the control system operates the compressor as if it was a fully degraded component (e.g., 100,000+ operational hours) regardless of whether the compressor is new or old. In doing so, a margin between the surge line for the compressor and an operating threshold, often referred to as an operating limit line, is over exaggerated and/or maintained at a higher degree than may be necessary. This is especially true when the compressor is in fact a new and not degraded machine. While conventional systems and procedure may mitigate the risk of surge occurring at the end of the operational life for the compressor, operating a compressor as if it was a fully degraded component reduces the operational efficiency of compressor, and in turn is reducing the operational efficiency and/or output of the entire gas turbine system in the early stages of operational time and/or life of the compressor.

SUMMARY

A first aspect of the disclosure provides a system, including at least one computing device in communication with: a gas turbine system including a compressor having an inlet guide vane, at least one sensor positioned within or adjacent the gas turbine system, the at least one sensor measuring an operational characteristic of the gas turbine system, and a pressure sensor positioned adjacent the gas turbine system for measuring an ambient fluid pressure surrounding the gas turbine system, wherein the at least one computing device is configured to adjust operational parameters of the gas turbine system by performing processes including: adjusting the measured operational characteristic and the measured ambient fluid pressure based on predetermined measurement uncertainties for the at least one sensor and the pressure sensor, respectively; estimating an first mass flow rate for the compressor of the gas turbine system based on the adjusted, measured operational characteristic, and the adjusted, measured ambient fluid pressure surrounding the gas turbine system; calculating a second mass flow rate for the compressor of the gas turbine system based on the adjusted, measured operational characteristic, and the adjusted, measured ambient fluid pressure surrounding the gas turbine system; determining a mass flow loss between the estimated, first mass flow rate and the calculated, second mass flow rate for the compressor of the gas turbine system; and adjusting an operating limit (OL) threshold for the compressor of the gas turbine system based on the mass flow loss, the OL threshold for the compressor being below a predetermined surge threshold for the compressor.

A second aspect of the disclosure provides a computer program product including program code, which when executed by at least one computing device, causes the at least one computing device to adjust operational parameters of a gas turbine system including a compressor having an inlet guide vane, by performing processes including: adjusting an operational characteristic measured by at least one sensor positioned within or adjacent the gas turbine system and adjusting an ambient fluid pressure measured by a pressure sensor positioned adjacent the gas turbine system, the measured operational characteristic and the measured ambient fluid pressure adjusted based on predetermined measurement uncertainties for the at least one sensor and the pressure sensor, respectively; estimating an first mass flow rate for the compressor of the gas turbine system based on the adjusted, measured operational characteristic, and the adjusted, measured ambient fluid pressure surrounding the gas turbine system; calculating a second mass flow rate for the compressor of the gas turbine system based on the adjusted, measured operational characteristic, and the adjusted, measured ambient fluid pressure surrounding the gas turbine system; determining a mass flow loss between the estimated, first mass flow rate and the calculated, second mass flow rate for the compressor of the gas turbine system; and adjusting an operating limit (OL) threshold for the compressor of the gas turbine system based on the mass flow loss, the OL threshold for the compressor being below a predetermined surge threshold for the compressor.

A third aspect of the disclosure provides a method for adjust operational parameters of a gas turbine system including a compressor having an inlet guide vane. The method includes: adjusting an operational characteristic measured by at least one sensor positioned within or adjacent the gas turbine system and adjusting an ambient fluid pressure measured by a pressure sensor positioned adjacent the gas turbine system, the measured operational characteristic and the measured ambient fluid pressure adjusted based on predetermined measurement uncertainties for the at least one sensor and the pressure sensor, respectively; estimating an first mass flow rate for the compressor of the gas turbine system based on the adjusted, measured operational characteristic, and the adjusted, measured ambient fluid pressure surrounding the gas turbine system; calculating a second mass flow rate for the compressor of the gas turbine system based on the adjusted, measured operational characteristic, and the adjusted, measured ambient fluid pressure surrounding the gas turbine system; determining a mass flow loss between the estimated, first mass flow rate and the calculated, second mass flow rate for the compressor of the gas turbine system; and adjusting an operating limit (OL) threshold for the compressor of the gas turbine system based on the mass flow loss, the OL threshold for the compressor being below a predetermined surge threshold for the compressor.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

As an initial matter, in order to clearly describe the current disclosure it will become necessary to select certain terminology when referring to and describing relevant machine components within combined cycle power plants. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the engine, and "aft" referring to the rearward or turbine end of the engine. It is often required to describe parts that are at differing radial positions with regard to a center axis. The term "radial" refers to movement or position perpendicular to an axis. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine.

As indicated above, the disclosure relates generally to gas turbine systems, and more particularly, to systems, program products, and methods for adjusting an operating limit (OL) threshold for a compressor of the gas turbine systems based on a mass flow loss for the compressor.

These and other embodiments are discussed below with reference to FIGS. 1-5. However, those skilled in the art will readily appreciate that the detailed description given herein with respect to these Figures is for explanatory purposes only and should not be construed as limiting.

Figure 1:
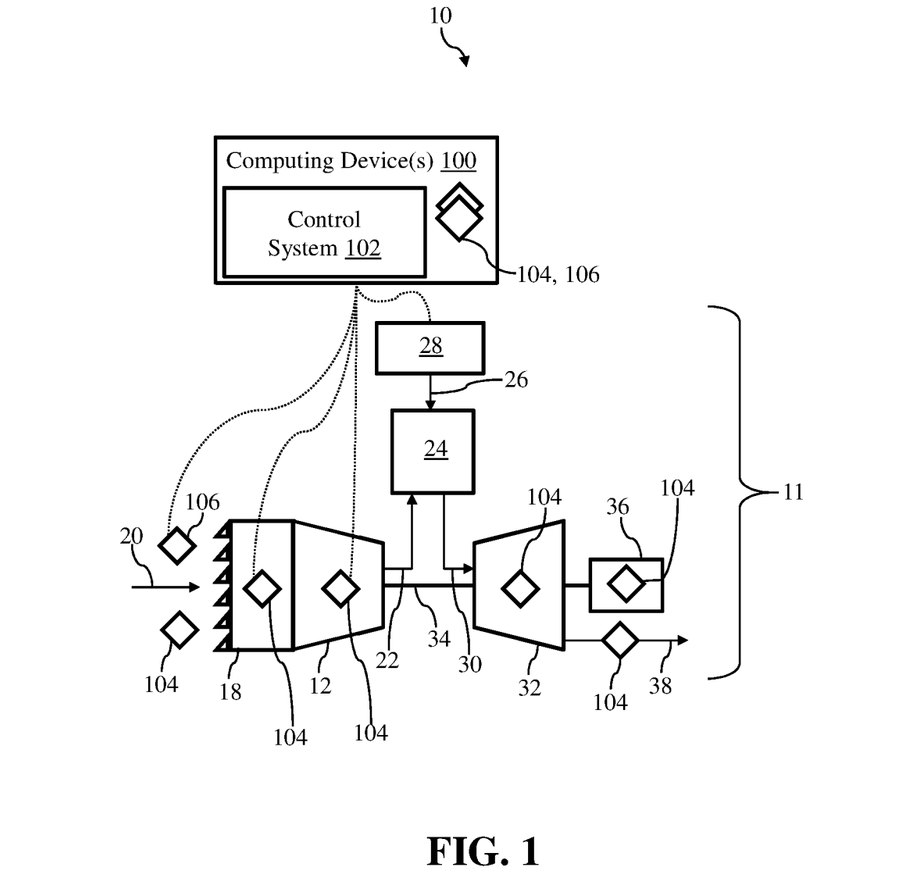
FIG. 1 shows a schematic depiction of a gas turbine system including a control system, according to various embodiments of the disclosure.

FIG. 1 shows a schematic depiction of a system 10 including a gas turbine system 11 according to various embodiments of the disclosure. Gas turbine system 11 of system 10 may include a compressor 12 and a variable or adjustable inlet guide vane (IGV) 18 coupled or positioned on compressor 12 and/or positioned upstream of an inlet of compressor 12. Compressor 12 compresses an incoming flow of fluid 20 (e.g., air) that may flow through IGV 18 into compressor 12. As discussed herein, IGV 18 may regulate the mass flow or flow rate of fluid 20 as it flows through IGV 18 to compressor 12. Compressor 12 delivers a flow of compressed fluid 22 (e.g., compressed air) to a combustor 24. Combustor 24 mixes the flow of compressed fluid 22 with a pressurized flow of fuel 26 provided by a fuel supply 28 and ignites the mixture to create a flow of combustion gas 30.

The flow of combustion gas 30 is in turn delivered to a turbine component 32, which typically includes a plurality of turbine blades (not shown). The flow of combustion gas 30 drives turbine component 32 to produce mechanical work. The mechanical work produced in turbine component 32 drives compressor 12 via a shaft 34, and may be used to drive a generator 36 (e.g., external component) configured to generate power and/or produce a load. Combustion gas 30 flowed through and driving turbine blades of turbine component 32, may be exhausted from turbine component 32 via an exhaust housing or conduit 38 and released into the atmosphere or alternatively (re)used by another system (e.g., steam turbine system).

Although gas turbine system 11 is shown in FIG. 1 to include a single shaft configuration, it is understood that in other non-limiting examples, gas turbine system 11 may include a dual shaft or rotor configuration.

As shown in FIG. 1, system 10 may also include at least one computing device 100 operably coupled to and/or configured to control or adjust operational parameters of gas turbine system 11. Computing device(s) 100 can be hardwired and/or wirelessly connected to and/or in communication with gas turbine system 11, and its various components (e.g., compressor 12, IGV 18, turbine component 32, and so on) via any suitable electronic communication component or technique. As discussed herein, computing device(s) 100 may be in communication with the various components of gas turbine system 11 (not shown for clarity) to control/ adjust the operations and/or operational parameters of the components to increase performance of gas turbine system 11 and/or prevent undesired operational conditions (e.g., compressor fouling). In various embodiments, computing device(s) 100 can include a control system 102 and a plurality of sensors 104, 106, as described herein, to obtain or measure operational characteristics for gas turbine system 11. As discussed herein control system 102 may be used in controlling/adjusting operational parameters of gas turbine system 11, and its various components.

Computing device(s) 100 of system 10 may include and/or may be in electrical communication with a plurality of sensors 104, 106. As shown in the non-limiting example of FIG. 1, at least one or a plurality of sensor(s) 104 (a portion shown in phantom) of and/or connected to computing device(s) 100 may be positioned in various locations within or adjacent gas turbine system 11 to measure, detect, and/or obtain operational characteristics of gas turbine system 11 during operation. As such, the positions of sensor(s) relative to gas turbine system 11, and/or the type/configuration of sensor(s) 104 may determine the operational characteristics measured or detected. For example, sensor 104 positioned directly adjacent and/or upstream of compressor 12, and more specifically the inlet of compressor 12 including IGV 18. In this non-limiting example, sensor 104 may be configured and/or formed from any suitable sensor that may measure, detect, or obtain the inlet temperature for fluid 20 flowing to compressor 12; commonly referred to as compressor inlet temperature. Additionally, or alternatively, distinct sensor(s) 104 positioned within inlet of compressor 12 including IGV 18 and/or directly within compressor 12 (and downstream of IGV 18) may also be positioned, configured, and/or formed from any suitable sensor that may measure, detect, or obtain the compressor inlet temperature based on fluid 20.

In the non-limiting example shown in FIG. 1, computing device 100 may include additional sensor(s) 104 positioned through gas turbine system 11. For example, a plurality of distinct sensor(s) 104 may be positioned within, adjacent, and/or in communication with turbine component 32, generator 36, exhaust conduit 38, supply lines between compressor 12/turbine component 32 and combustor 24 (not shown), shaft 34 (not shown), and so on. Each of these sensor(s) 104 may be positioned and/or configured to identify, detect, and/or measure additional or distinct operational characteristics for gas turbine system 11. The distinct operational characteristics may differ from the compressor inlet temperature based on fluid 20. Additionally, and as discussed herein, the distinct operational characteristics may be explicitly used in aiding in the control or adjusting operational parameters of gas turbine system 11, and/or may be used to calculate inputs or information that be used in aiding in the control or adjusting operational parameters of gas turbine system 11. The operational characteristics may include, but are not limited to exhaust temperatures for combustion gas 30 flowing through exhaust conduit 38, ambient humidity for or surrounding gas turbine system 11, a compressor discharge temperature (e.g., temperature of compressed fluid 22), compressor discharge pressure (e.g., pressure of compressed fluid 22), a fuel flow rate for gas turbine system 11 as supplied by fuel supply 28, a power output for gas turbine system 11 based on, for example, operation of generator 36, an inlet temperature for compressor 12, inlet pressure drop experienced within compressor 12/IGV 18, exhaust pressure drop experienced within turbine component 32, position of IGV 18 (e.g., angle or degree of openness), inlet bleed heat valve position, and so on.

Although six sensors 104 are shown, it is understood that in other non-limiting examples, system 10 may include more or less sensors 104 that may be configured to provide computing device(s) 100, and specifically control system 102, with information or data relating operational characteristics for gas turbine system 11 during operation.

Additionally as shown in FIG. 1, sensor 106 of computing device(s) 100 may be positioned adjacent gas turbine system 11. More specifically, sensor 106 may be positioned directly adjacent and/or upstream of compressor 12 and/or IGV 18 which may receive fluid 20 during operation. In the non-limiting example, sensor 106 may be formed as a pressure sensor that may be configured and/or formed to measure an ambient fluid pressure for fluid 20 surrounding gas turbine system 11 and/or fluid 20 utilized by gas turbine system 11 during operation. As discussed herein, sensor 106, and the measured/detected ambient fluid pressure, may be used to determine the mass flow rate for fluid 20 flowing through compressor 12 during operation, and ultimately aid in adjusting operational parameters for gas turbine system 11 during operation.

In a non-limiting example, sensor(s) 104, 106 may intermittently sense, detect, and/or obtain data relating to the operational characteristic(s) and/or ambient fluid pressure for gas turbine system 11 during operation. The intermittent interval or period in which sensor(s) obtain the data may be determined by, for example, operational hours for gas turbine system 11, operational life of gas turbine system 11, operational status (e.g., start-up, steady-state), the type of data being obtained by the sensor(s) 104, 106, and the like. In another non-limiting example, sensor(s) 104, 106 may continuously sense, detect, and/or obtain data relating to the operational characteristic(s) and/or ambient fluid pressure for gas turbine system 11 during operation.

Figure 2:
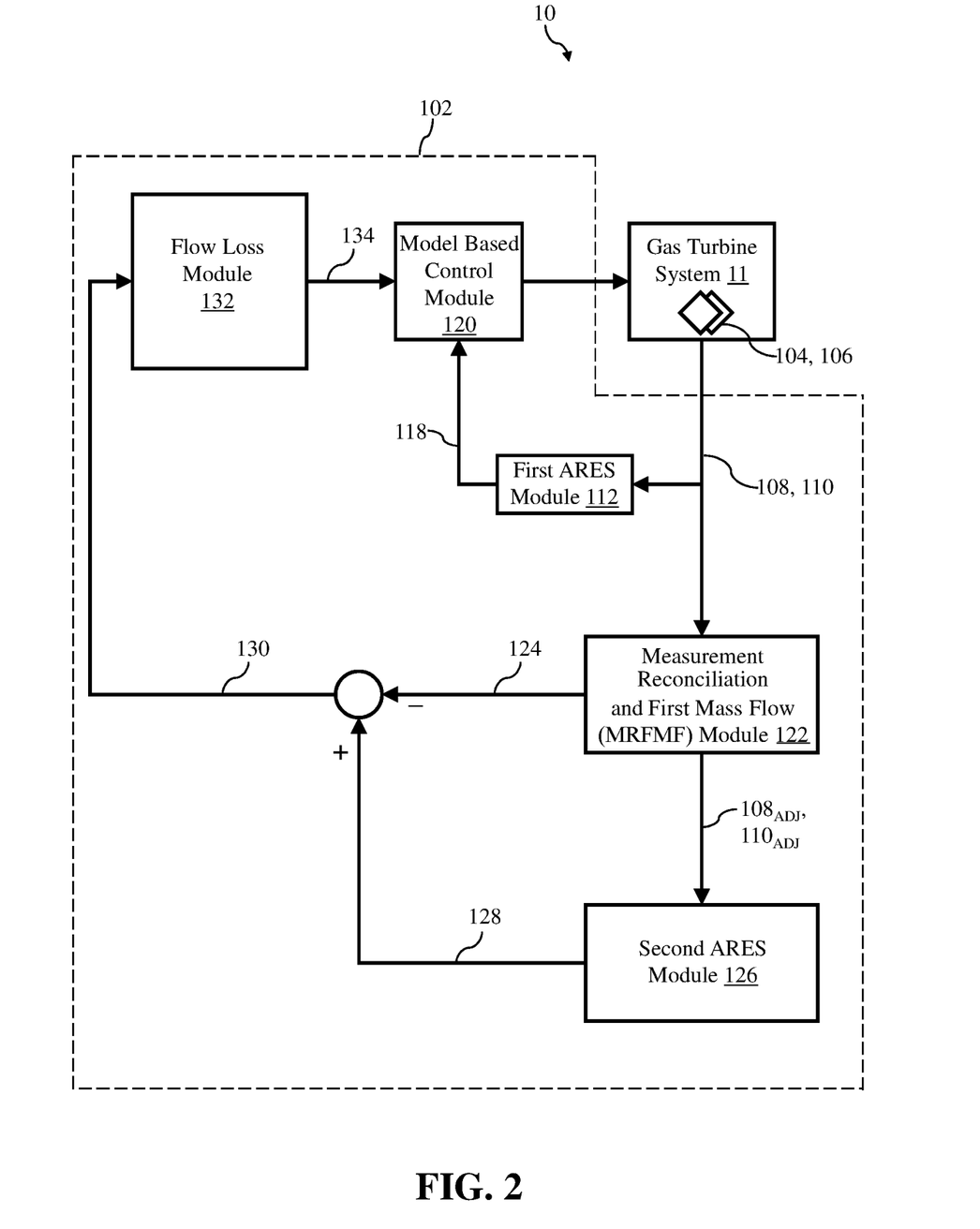
FIG. 2 shows a schematic view of the control system for the gas turbine system of FIG. 1, according to embodiments of the disclosure.

Turning to FIG. 2, a schematic view of control system 102 for computing device(s) 100 is shown. In the non-limiting example, and as discussed herein, each individual component or feature shown in FIG. 2 may identify or represent a portion or "module" of control system 102, and may be separated for the sake of more clearly defining the function or operation of control system 102 (and each module) when adjusting parameters for gas turbine system 11. Additionally, it is understood that similarly numbered and/or named components may function in a substantially similar fashion. Redundant explanation of these components has been omitted for clarity.

As shown in FIG. 2, and as discussed herein with respect to FIG. 1, data relating to operation of gas turbine system 11 may be measured. More specifically, data relating to the operation of gas turbine system 11 may be measured, detected, and/or obtained by sensor(s) 104 and pressure sensor 106 positioned within and/or adjacent gas turbine system 11. As similarly discussed herein, operational characteristic(s) data 108 may be obtained by sensor(s) 104. The operational characteristic(s) data 108 may include, but is not limited to, the compressor inlet temperature for or based on fluid 20 entering compressor 12 (see, FIG. 1). Additionally, operational characteristic(s) data 108 may include, but is not limited to, exhaust temperatures for combustion gas 30 flowing through exhaust conduit 38, ambient humidity for or surrounding gas turbine system 11, a compressor discharge temperature (e.g., temperature of compressed fluid 22), compressor discharge pressure (e.g., pressure of compressed fluid 22), a fuel flow rate for gas turbine system 11 as supplied by fuel supply 28, a power output for gas turbine system 11 based on, for example, operation of generator 36, and so on. Ambient fluid pressure data 110 based on the ambient fluid pressure surrounding gas turbine system 11 may be obtained or detected by pressure sensor 106. Once obtained, detected, and/or measured, operational characteristic(s) data 108 and ambient fluid pressure data 110 may be provided or supplied from sensors 104, 106 positioned within and/or adjacent gas turbine system 11 to various portions or modules within control system 102 of computing device(s) 100 (see, FIG. 1) for additional processing and/or manipulation.

In a non-limiting example, the measured data relating to the operation of gas turbine system 11, and more specifically operational characteristic(s) data 108 and ambient fluid pressure data 110 may be provided to a first module of control system 102 configured to aid in adjusting operational parameters of gas turbine system 11. In a non-limiting example, first module of control system 102 that may receive operational characteristic(s) data 108 and ambient fluid pressure data 110 may include and/or may be configured as an adaptive real time engine simulation model (ARES) module. First ARES module 112 is discussed in detail in U.S. Pat. No. 7,742,904, issued on Jun. 22, 2010, which is incorporated by reference in its entirety herein. In the non-limiting example, first ARES module 112 may receive and utilize operational characteristic(s) data 108 and ambient fluid pressure data 110 within an operational model of gas turbine system 11 to generate predictive ARES operating characteristic(s). The operational model of gas turbine system 11 may be based, at least in part, on an ideal, optimized, uninhibited, and/or "new-and-clean system" performance or operation for a model that is identical (e.g., identical build parameters, identical compressor/combustor/turbine component-type, etc.) as gas turbine system 11. A difference between the measured or detected operational characteristic(s) data 108 and ambient fluid pressure data 110, and corresponding, predictive ARES operating characteristic(s)/ambient fluid pressure, generated by the model in first ARES module 112, may be determined and utilized in modifying, adjusting, and/or tuning the model of GT system 11 using, for example, Kalman filters or Kalman filter processes. Once adjusted or tuned, first ARES module 112 may generated a predictive output or predictive operational parameters 118 (e.g., firing temperature, position on IGV, and so on) for gas turbine system 11 to a model based control module 120. Model based control module 120 may analyze the predictive operational parameters 118, along with other information or data discussed herein, to adjust operational parameters of gas turbine system 11.

Measured or detected operational characteristic(s) data 108 and ambient fluid pressure data 110 may also be provided directly to a measurement reconciliation and first mass flow (MRFMF) module 122 (hereafter, "MRFMF module 122"). MRFMF module 122 may receive or obtain measured operational characteristic(s) data 108 and ambient fluid pressure data 110, and may perform various processes using the measured data. For example, MRFMF module 122 may be configured to adjust the measured operational characteristic(s) data 108 and ambient fluid pressure data 110. That is, MRFMF module 122 may adjust, change, scale, and/or alter the measured data values for operational characteristic(s) data 108 and ambient fluid pressure data 110 as measured by sensor(s) 104, 106. In a non-limiting example, MRFMF module 122 may adjust the measured operational characteristic(s) data 108 and ambient fluid pressure data 110 based on predetermined measurement uncertainties for sensor(s) 104 and pressure sensor 106, and calculated operational principles for gas turbine system 11. More specifically, each sensor 104, 106 utilized within gas turbine system 11 may include a predetermined uncertainty, sensitivity, and/or data detection deviation based on operation and/or manufacturing variables. As such, an operator or user of system 10 including gas turbine system 11 and control system 102 may understand that the data values associated with measured operational characteristic(s) data 108 and measured ambient fluid pressure data 110 may be skewed based on the known uncertainty.

Using the measured operational characteristic(s) data 108 and ambient fluid pressure data 110, MRFMF module 122 may calculate an operational principle of gas turbine system 11 using measured operational characteristic(s) data 108 and ambient fluid pressure data 110 as inputs. The operational principle of gas turbine system 11 may include any calculable, thermodynamic equation used in estimating operational details for gas turbine system 11. For example, the calculated operational principle of gas turbine system 11 may include a conservation of energy (e.g., $\Delta U = Q - W$), a conservation of mass (e.g., $\rho_{in} A_{in} V_{in} = \rho_{out} A_{out} V_{out}$), and/or the like. MRFMF module 122 may than compare the calculated operational principle of gas turbine system 11 to a predefined operational principle for gas turbine system 11. The predefined operational principle may be based on an operational model of gas turbine system 11, similar to that discussed herein with respect to first ARES module 112. That is, the operational model of gas turbine system 11 used by MRFMF module 122 may be based, at least in part, on an ideal, optimized, uninhibited and/or "new-and-clean system" performance or operation for a model that is identical (e.g., identical build parameters, identical compressor/combustor/turbine component-type, etc.) as gas turbine system 11. Additionally, the predefined operational principle may be the same principle or thermodynamic equation (e.g., conservation of energy), and may be based on the operational module operating under conditions identical to the measured operational characteristic(s) data 108 and ambient fluid pressure data 110. For example, MRFMF module 112 may determine, calculate, or obtain the predefined operational principle value based on the measured operational characteristic(s) data 108 and ambient fluid pressure data 110. Where there is a discrepancy between the calculated operational principle of gas turbine system 11 and the predefined operational principle for gas turbine system 11, MRFMF module 112 may adjust the value of the measured operational characteristic(s) data 108 and ambient fluid pressure data 110. MRFMF module 112 may adjust each value of the measured operational characteristic(s) data 108 and ambient fluid pressure data 110 based on the predetermined measurement uncertainties for each sensor(s) 104, 106 obtaining, measuring, and/or detecting the values during operation of gas turbine system 11.

Once adjusted, MRFMF module 112 may recalculate the operational principle of gas turbine system 11 using the adjusted operational characteristic(s) data 108 and adjusted ambient fluid pressure data 110, and compare the recalculated operational principle with the predefined operational principle for gas turbine system 11 based on the model. If necessary, MRFMF module 112 may also readjust the value of the adjusted operational characteristic(s) data 108 and adjusted ambient fluid pressure data 110 until the calculated principle of the gas turbine system 11 is substantially equal to the predefined operational principle of gas turbine system 11. When MRFMF module 112 determines that the calculated principle of the gas turbine system 11 is substantially equal to the predefined operational principle of gas turbine system 11, than the values for the adjusted, measured operational characteristic(s) data $108_{ADJ}$ and the value for the adjusted, measured ambient fluid pressure data $110_{ADJ}$ may be finally adjusted, may be accurate, and/or may "compensate" for the predetermined measurement uncertainties for each sensor 104, 106.

As shown in FIG. 2, the adjusted, measured operational characteristic(s) data $108_{ADJ}$ and the adjusted, measured ambient fluid pressure data $110_{ADJ}$ may be further utilized by MRFMF module 112 and/or other portions of control system 102. For example, MRFMF module 112 may also be configured to estimate an actual or first mass flow rate 124 for compressor 12 (see, FIG. 1) of gas turbine system 11. First mass flow rate 124 for compressor 12 may represent an estimated flow rate at the time and/or under the operational conditions in which operational characteristic(s) data 108 and ambient fluid pressure data 110 are measured by sensors 104, 106, as discussed herein. Additionally, and as discussed herein, first mass flow rate 124 may also represent a "degraded" mass flow rate for compressor 12 based on, for example, operational hours, impurities built up on features of compressor 12 (e.g., blades and nozzles), and the like. MRFMF module 112 may estimate first mass flow rate 124 based on the adjusted, measured operational characteristic(s) data $108_{ADJ}$ and the value for the adjusted, measured ambient fluid pressure data $110_{ADJ}$. In a non-limiting example, the adjusted operational characteristic data $108_{ADJ}$ may correspond to an adjusted value for the compressor inlet temperature based on or for fluid 20 used by compressor 12 (see, FIG. 1). Using the adjusted value for the compressor inlet temperature (e.g., adjusted, measured operational characteristic(s) data $108_{ADJ}$), the adjusted, measured ambient fluid pressure data $110_{ADJ}$, and known or predetermined information for gas turbine system 11 and/or compressor 12, MRFMF module 112 may estimate first mass flow rate 124 for compressor 12. As discussed herein, estimated first mass flow rate 124 may be provided to different portions or modules of control system 102 for additional processing to aid in adjusting the operational parameters of gas turbine system 11.

The adjusted, measured operational characteristic(s) data $108_{ADJ}$ and the adjusted, measured ambient fluid pressure data $110_{ADJ}$ may also be utilized by other portions of control system 102. For example, and as shown in FIG. 2, once MRFMF module 112 forms or generates adjusted, measured operational characteristic(s) data $108_{ADJ}$ and adjusted, measured ambient fluid pressure data $110_{ADJ}$, MRFMF module 112 may provide adjusted measured operational characteristic(s) data $108_{ADJ}$ and adjusted, measured ambient fluid pressure data $110_{ADJ}$ to a second ARES module 126 of control system 102. Second ARES module 126 may be configured substantially similar to first ARES module 112 discussed herein. However, distinct from first ARES module 112, second ARES module 126 may be configured to utilize distinct inputs or data, and subsequently provide distinct outputs or calculations. For example, second ARES module 126 may be configured to receive/obtain, and use adjusted, measured operational characteristic(s) data $108_{ADJ}$ and the adjusted, measured ambient fluid pressure data $110_{ADJ}$ to calculate a second mass flow rate 128 for compressor 12 of gas turbine system 11. Second mass flow rate 128 may represent an ideal, optimized, uninhibited, desired, "best case scenario," and/or "new-and-clean compressor" performance or operation for compressor 11 at the time and/or under the operational conditions in which operational characteristic(s) data 108 and ambient fluid pressure data 110 are measured by sensors 104, 106, as discussed herein. Also distinct from first ARES module 112, second ARES module 126 may not include any filters (e.g., Kalman filters), as second ARES module 126 utilizes a predefined operational model of gas turbine system 11, as discussed herein.

Second ARES module 126 may calculate second mass flow rate 128 for compressor 12 based on and/or using adjusted, measured operational characteristic(s) data $108_{ADJ}$ and adjusted, measured ambient fluid pressure data $110_{ADJ}$, as generated by MRFMF module 122. In a non-limiting example, the adjusted operational characteristic data $108_{ADJ}$ may correspond to an adjusted value for the compressor inlet temperature based on or for fluid 20 used by compressor 12 (see, FIG. 1). Using the adjusted value for the compressor inlet temperature (e.g., adjusted, measured operational characteristic(s) data $108_{ADJ}$), the adjusted, measured ambient fluid pressure data $110_{ADJ}$, and a predefined operational model for gas turbine system 11, second ARES module 126 may calculate second mass flow rate 128 for compressor 12. Specifically, second ARES module 126 may calculate second mass flow rate for compressor 12 based on the predefined operational model of gas turbine system 11 operating under conditions identical to adjusted, measured operational characteristic(s) data $108_{ADJ}$ and adjusted, measured ambient fluid pressure data $110_{ADJ}$. Similar to the model used in MRFMF module 122, the predefined operational model used by second ARES module 126 may be based, at least in part, on an ideal, optimized, uninhibited, and/or "new-and-clean" performance or operation for a model that is identical (e.g., identical build parameters, identical compressor/combustor/turbine component-type, etc.) as gas turbine system 11. As such, once calculated, second mass flow rate 128 may not be altered or adjusted due to tuning within second ARES module 126 (e.g., Kalman filter tuning), as the calculated value for second mass flow rate 128 may represent the desired mass flow rate for compressor 12 under identical operational conditions as those used to estimate first mass flow rate 124. Additionally, or alternatively, second ARES module 126 may utilize additional adjusted, operational characteristic(s) data $108_{ADJ}$ in calculating second mass flow rate 128. For example, second ARES module 126 may use the adjusted, measured fuel flow rate for gas turbine system 11 as supplied by fuel supply 28 (see, FIG. 1) when calculating second mass flow rate 128.

Once first mass flow rate 124 is estimated by MRFMF module 122 and second mas flow rate is calculated by second ARES module 126, the respective mass flow rates may determine a mass flow loss 130 for compressor 12 of gas turbine system 11. That is, mass flow loss 130 may be determined between and/or based on estimated, first mass flow rate 124 and calculated, second mass flow rate 128 for compressor 12 of gas turbine system 11 operating under conditions identical to adjusted, measured operational characteristic(s) data $108_{ADJ}$ and adjusted, measured ambient fluid pressure data $110_{ADJ}$. In a non-limiting example shown in FIG. 2, estimated, first mass flow rate 124 may be subtracted from calculated, second mass flow rate 128 to determine mass flow loss 130. In another non-limiting example mass flow loss 130 may be determined as a percentage of loss between estimated, first mass flow rate 124 and calculated, second mass flow rate 128 for compressor 12. Determined mass flow loss 130 for compressor 12 of gas turbine system 11 may then be provided to flow loss module 132 of control system 102 for additional processing to aid in adjusting operational parameters of gas turbine system 11.

Although shown in FIG. 2 as first being determined, than provided to flow loss module 132, mass flow loss 130 may be determined by flow loss module 132. That is, and in another non-limiting example, both estimated, first mass flow rate 124 and calculated, second mass flow rate 128 for compressor 12 may be provided to flow loss module 132 individually, and flow loss module 132 may be configured to determine mass flow loss 130 between estimated, first mass flow rate 124 and calculated, second mass flow rate 128, as discussed herein.

Flow loss module 132 may receive and/or obtain the determined mass flow loss 130 for compressor 12, and analyze the determined mass flow loss 130 to determine (if and) how the operational parameters of gas turbine system can be adjusted. More specifically, flow loss module 132 may analysis the determined mass flow loss 130 and may be configured to provide instructions input, and/or data 134 on how to adjust an operational line (OL) threshold for compressor 12 of gas turbine system 11 to improve operational efficiency and/or output, as well as reduce the risk of fouling within compressor 12. The adjustment of the OL threshold for compressor 12 may be based on the mass flow loss 130 between estimated, first mass flow rate 124 and calculated, second mass flow rate 128, as discussed.

Figure 3:
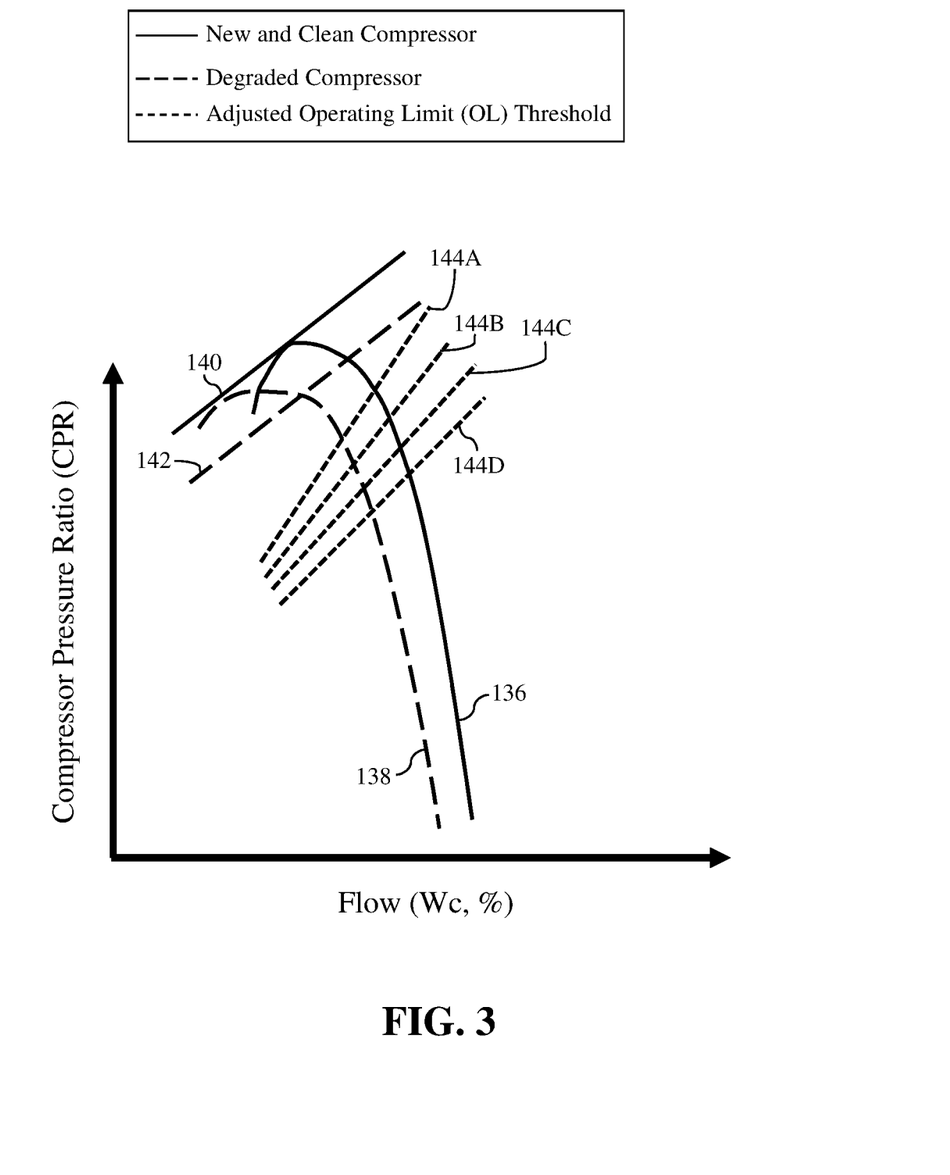
FIG. 3 shows an example compressor operational graph including a conventional method of operating a compressor of a gas turbine system and methods of adjusting operating limit (OL) thresholds for the compressor of FIG. 1, according to embodiments of the disclosure.

Turning to FIG. 3, and with continued reference to FIG. 2, compressor 12 operational graph including various thresholds is shown. The graph of FIG. 3 may further aid in describing the function and/or operation of flow loss module 132 and/or the instructions 134 generated by flow loss module 132 for aiding in adjusting the operational parameters of gas turbine system 11 during operation. As shown in FIG. 3, the operational graph or relationship for compressor 12 is shown in terms of compressor pressure ration (CPR) and flow of fluid within compressor 12, as represented by a corrected flow (Wc) for gas turbine system 11 (see, FIG. 1). In the FIG. 3, two distinct operational relationship are represented: an operational relationship for a new and clean operational compressor 136 (e.g., solid line), and an operational relationship for a degraded compressor (e.g., long, dashed line). The degradation of compressor 12, which in turn forms degraded relationship 138 may be a result of compressor 12 operating for a specific number of hours, based on detected or calculated part or component degradation (e.g., blade/nozzle degradation or creep), decrease in detected or calculated operational efficiency for gas turbine system 11, and the like. Additionally as shown in FIG. 3, each new and clean operational relationship 136 for compressor 12 and degraded relationship 138 for compressor 12 may include a surge threshold 140, 142. Surge thresholds 140, 142 may represent the pressure ratio for compressor 12 where fouling may occur, e.g., the fluid flow separates from the blades/nozzles within the compressor and reverses direction, based on the relationship and/or under the operational characteristic(s) for gas turbine system 11 as detected by sensors 104, 106. In a non-limiting example, surge thresholds 140, 142 for each new and clean operational relationship 136 for compressor 12 and degraded relationship 138 for compressor 12 may be predetermined, calculated, and/or know by mass flow loss module 132 of control system 102 (see, FIG. 2).

As discussed herein, mass flow loss module 132 (see, FIG. 2) may adjust an OL threshold 144 for compressor 12 of gas turbine system 11 during operation based on the determined mass flow loss 130 for compressor 12. As shown in FIG. 3, and as discussed herein, OL threshold 144 may represent the upper limit of the operating pressure ratio for compressor 12 during operation of gas turbine system 11. Additionally, OL threshold 144 may be dependent, at least in part, on operational characteristic(s) of gas turbine system 11 including, but not limited to, ambient fluid pressure the gas turbine system 11 as detected by sensor 106, the operational speed of shaft 34 for gas turbine system 11, the operating hours of gas turbine system 11, operational degradation within compressor 12, and the like. Furthermore, OL threshold 144, and the adjustment of OL threshold 144 may be dependent on mass flow loss 130 between estimated, first mass flow rate 124 and calculated, second mass flow rate 128. That is, flow loss module 132 (see, FIG. 2) may obtain the determined mass flow loss 130, and may analyze and/or compare mass flow loss 130 in view of new and clean operational relationship 136, degraded relationship 138, and predefined surge thresholds 140, 142 to determine if and how OL threshold 144 for compressor 12 should be adjusted. As discussed herein, flow loss module 132 may provide instructions 134 to model based control module 120 that determine how OL threshold 144 of compressor 12 is adjusted.

In non-limiting examples, flow loss module 132 may receive mass flow loss 130 that indicates that the difference between estimated, first mass flow rate 124 and calculated, second mass flow rate 128 is minimal, below a predefined difference value, and/or within or below a predetermined range. Flow loss module 132 may determine that the minimal or within the predetermined range value for mass flow loss 130 may indicate that that compressor 12 of gas turbine system 11 is operating as efficiently or close to a desired/optimal operational efficiency as possible (e.g., substantially equal to the model operational efficiency), and in turn the risk or likelihood of fouling is substantially low. This may also be in indicator that compressor 12 of gas turbine system 11 has not been operating for extended hours and/or may closely resemble an ideal, optimized, and/or "new-and-clean" compressor 12 within gas turbine system 11. As such, flow loss module 132 may provide instructions 134 to model based control module 120 indicating that OL threshold 144 may be increased and/or the margin between OL threshold 144 and surge threshold 140 may be decreased, based on mass flow loss 130. As shown in FIG. 3, OL threshold 144A may be positioned close to surge threshold 140 and/or may have the smallest margin separating OL threshold 144 and surge threshold 140. As such, when gas turbine system 11, and more specifically compressor 12, is determined to have a minimal flow loss, compressor 12 may operate at OL threshold 144A below surge threshold 140 to avoid fouling, but with increased operational efficiency and/or output for gas turbine system 11.

However, as compressor 12 and/or gas turbine system 11 degrades over time and/or operational characteristic(s) data 108 and/or ambient fluid pressure data 110 degrades or reduces the efficiency of gas turbine system 11, mass flow loss 130 for compressor 11 may increase. As mass flow loss 130 increases beyond the minimal amount, above the predefined difference value, and/or outside of or above a predetermined range, mass flow loss module 132 may further adjust OL threshold 144. In response to determining mass flow loss 130 is increasing in value (and over time) due to compressor degradation, mass flow loss module 132 may provide instructions 134 to model based control module 120 indicating that OL threshold 144 may be decreased, and/or the margin between OL threshold 144 and surge threshold 140 may be increased, based on mass flow loss 130. As shown in FIG. 3, instructions 134 provided by mass flow loss module 132 may indicate that as mass flow loss 130 increases, compressor 12 may be required to operate at OL thresholds 144B, 144C, or 144D. The reduced OL threshold 144B, 144C, 144D may be determined by mass flow loss module 132 based on the value of mass flow loss 130, as discussed herein. As shown in FIG. 3, reduced OL thresholds 144B, 144C, 144D may have a greater margin between predetermined surge thresholds 140, 142 than compared to OL threshold 144A. Operating compressor 12 at OL thresholds 144B, 144C, 144D may mitigate and/or decrease the risk of fouling based on the operational pressure ratio for degraded compressor 12.

As discussed herein, instructions 134 provided to model based control module 120 by mass flow loss module 132 may indicate the desired OL threshold 144 for compressor 12 based on mass flow loss 130. Additionally, instructions 134 may provide input and/or information relating to operational parameters for compressor 12 and/or gas turbine system 11 that may be adjusted to ensure compressor 11 is operating at OL threshold 144. For example, flow loss module 132 may provide instructions 134 to adjust OL threshold 144 by adjusting a rotational speed of shaft 34 of gas turbine system 11, where at least a portion of shaft 34 is positioned within and/or is part of compressor 11 (see, FIG. 1). Additionally, or alternatively, flow loss module 132 may provide instructions 134 to adjust OL threshold 144 by adjusting a position of IGV 18 for compressor 12 of gas turbine system 11 (see, FIG. 1). Adjusting the speed of shaft 34 and/or adjusting the position of IGV 18 may determine the amount of fluid 20 introduced and/or compressed by compressor 12 the gas turbine system 11, which in turn may affect (e.g., increase, decrease) the operating pressure ratio for compressor 11 and/or OL threshold 144.

In the non-limiting example discussed herein, determining mass flow loss 130 may allow compressor 12 to operate at a higher OL threshold 144A during, for example, the beginning life of gas turbine system 11 and/or when operational conditions for gas turbine system 11 are ideal or optimal. This in turn increases the power output for gas turbine system 11. Furthermore, by dynamically, continuously, or intermittently adjusted OL threshold 144 for compressor 12 based on determined mass flow loss 130, compressor 12 may operate at improved efficiencies, while still decreasing and/or eliminating the risk of fouling. That is, determining mass flow loss 130 allows control system 102 to operate compressor 12 at varying OL thresholds 144 over the operational life to both improve operational efficiency and output for gas turbine system, as well as reduce or eliminate the risk of fouling within compressor 12

Figure 4:
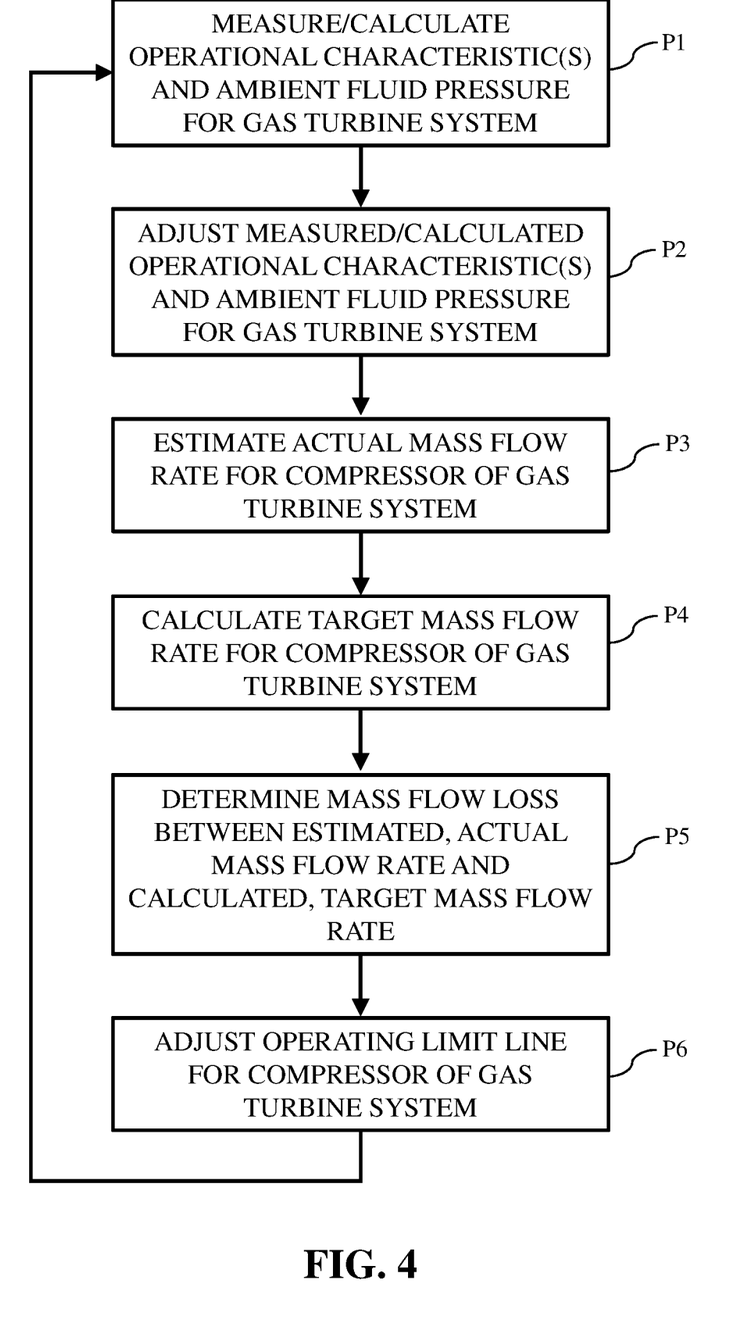
FIG. 4 shows example processes for adjusting operational parameters of the gas turbine system of FIG. 1, according to embodiments of the disclosure.

FIG. 4 shows a flow diagram illustrating non-limiting example processes of adjusting operational parameters of gas turbine system 11. These processes can be performed, e.g., by at least one computing device 100 including control system 102 (see, FIG. 1), as described herein. In other cases, these processes can be performed according to a computer-implemented method of adjusting operational parameters of gas turbine system 11. In still other embodiments, these processes can be performed by executing computer program code on computing device(s) 100, causing computing device (s) 100, and specifically control system 102, to adjust operational parameters of gas turbine system 11.

In process P1, operational characteristic(s) for a gas turbine system may be measured and/or calculated. More specifically, operational characteristic(s) for the gas turbine system and an ambient fluid pressure surrounding the gas turbine system may be measured and/or calculated. The operational characteristic(s) and ambient fluid pressure may be measured using sensor(s) positioned adjacent and/or within the gas turbine system. Alternatively, operational characteristic(s) of the gas turbine system may be calculated based on information or data obtained by sensors positioned adjacent and/or within the gas turbine system. The measured/calculated operational characteristic(s) may include, but are not limited to, a compressor inlet temperature based on the fluids used within the compressor of the gas turbine system, exhaust temperatures for combustion gas flowing through an exhaust conduit, an ambient humidity for or surrounding the gas turbine system, a compressor discharge temperature (e.g., temperature of compressed fluid), a compressor discharge pressure (e.g., pressure of compressed fluid), a fuel flow rate for the gas turbine system as supplied by a fuel supply connected to a combustor, a power output for the gas turbine system based on, for example, operation of a generator for the gas turbine system, an inlet temperature for the compressor, an inlet pressure drop experienced within the compressor/the IGV, the exhaust pressure drop experienced within the turbine component, the position of the IGV (e.g., angle or degree of openness), the inlet bleed heat valve position, and so on.

In process P2, the measured/calculated operational characteristic(s) and ambient fluid pressure may be adjusted. More specifically, the value or data or the measured/calculated operational characteristic(s) and ambient fluid pressure may be adjusted based on predetermined measurement uncertainties for the sensors measuring the operational characteristic(s) and ambient fluid pressure, respectively. The predetermined uncertainty for the sensors utilized within the gas turbine system may include or relate to a sensitivity and/or data detection deviation based on operation and/or manufacturing variables. Adjusting the measured/calculated operational characteristic(s) and ambient fluid pressure may further include calculating an operational principle of the gas turbine system using the measured operational characteristic(s) and the measured ambient fluid pressure. The operational principle of the gas turbine system may include any calculable, thermodynamic equation used in estimating operational details for the gas turbine system, for example, a conservation of energy equation, a conservation of mass equation, and/or the like. Once calculated, the operational principle of the gas turbine system may be compared to a predefined operational principle of the gas turbine. The predefined operational principle may be based on an operational model for the gas turbine system operating under conditions identical to the measured operational characteristic(s) and the measured ambient fluid pressure. Additionally, the operational model of the gas turbine system may be based, at least in part, on an ideal, optimized, uninhibited, and/or "new-and-clean" performance or operation for a model that is identical (e.g., identical build parameters, identical compressor/combustor/turbine component-type, etc.) as the gas turbine system. Finally, adjusting the measured/calculated operational characteristic(s) and ambient fluid pressure may further include adjusting the measured operational characteristic(s) and ambient fluid pressure based on the predetermined measurement uncertainties for the sensor(s) until the calculated operational principle of the gas turbine system is substantially equal to the predefined operational principle of the gas turbine system.

In process P3 a first mass flow rate for the compressor of gas turbine system is estimated. The estimated, first mass flow rate for the compressor of the gas turbine system may be based on the adjusted, measured operational characteristic(s) and the adjusted, measured ambient fluid pressure. The first mass flow rate for the compressor 12 may represent an estimated flow rate at the time and/or under the operational conditions in which the operational characteristic(s) data and ambient fluid pressure data are measured by sensors 104, 106 and/or the operational characteristic(s) data and ambient fluid pressure data is adjusted, as discussed herein. Additionally, and as discussed herein, the first mass flow rate may also represent a "degraded" mass flow rate for the compressor based on, for example, operational hours, impurities built up on features of the compressor (e.g., blades and nozzles), and the like.

In process P4, a second mass flow rate for the compressor of the gas turbine system may be calculated. More specifically, the second mass flow rate may be calculated based on the adjusted, measured operational characteristics and the adjusted, measured ambient fluid pressure surrounding the gas turbine system. The calculating of the second mass flow rate may further include calculating the second mass flow rate of the compressor based on the predefined operational model of the gas turbine system operating under conditions identical to the adjusted, measured operational characteristic(s) and the adjusted, measured ambient fluid pressure. In a non-limiting example, the predefined operational model of the gas turbine system may be substantially similar to the model used in process P3. The second mass flow rate may represent an ideal, optimized, uninhibited, desired, and/or "best case scenario" performance or operation for the compressor at the time and/or under the operational conditions in which the operational characteristic(s) data and the ambient fluid pressure data are measured/calculated (e.g., process P1) by the sensors.

In process P5, a mass flow loss for the compressor of the gas turbine system may be determined. More specifically, the mass flow loss between the estimated, first mass flow rate (e.g., process P3) and the calculated, second mass flow rate (e.g., process P4) may be determined. In a non-limiting example, the estimated, first mass flow rate may be subtracted from the calculated, second mass flow rate to determine the mass flow loss. In another non-limiting example the mass flow loss may be determined as a percentage of loss between the estimated, first mass flow rate and the calculated, second mass flow rate for the compressor.

In process P6, the operational line (OL) threshold for the compressor of the gas turbine system may be adjusted. More specifically, the OL threshold for the compressor may be adjusted based on the determined mass flow loss for the compressor as determined by the estimated, first mass flow rate and the calculated, second mass flow rate. The OL threshold for the compressor may be below a predetermined surge threshold for the compressor. In the non-limiting example, the OL threshold may represent the upper limit of the operating pressure ratio for the compressor during operation, while the predetermined surge threshold may represent the pressure ratio for the compressor where fouling may occur, e.g., the fluid flow separates from the blades/nozzles within the compressor and reverses direction. Each of the OL threshold and the predetermined surge threshold may be dependent, at least in part, on operational characteristic(s) of the gas turbine system including, but not limited to, ambient fluid pressure surrounding the gas turbine system, the operational speed of a shaft for the gas turbine system, the operating hours of the gas turbine system, operational degradation within the compressor, and the like. Adjusting the OL threshold for the compressor in process P6 may further include adjusting a speed of the shaft of the gas turbine system, and/or adjusting a position (e.g., open, closed) of the inlet guide vane for the compressor of the gas turbine system. Adjusting the speed of the shaft and/or adjusting the position of the inlet guide vane may determine the amount of fluid introduced and/or compressed by the compressor of the gas turbine system, which in turn may affect (e.g., increase, decrease) the operating pressure ratio for the compressor and/or the OL threshold.

As such, adjusting the OL threshold for the compressor may also include increasing or decreasing a margin between the OL threshold and the predetermined surge threshold for the compressor based on the determined mass flow loss. In non-limiting examples, the margin between the OL threshold and the predetermined surge threshold may be decreased and/or the OL threshold may move closer to, but may remain spaced from, the surge threshold in response to determining the mass flow loss is minimal and/or between a predetermined range. The margin may be decreased and/or the OL threshold may be moved closer to the predetermined surge threshold because the minimal mass flow loss may indicate that the compressor of the gas turbine system is operating as efficiently or close to a desired/optimal operational efficiency as possible, and as such the risk or likelihood of fouling is substantially low. However, as the mass flow loss increases and/or increases beyond the predetermined range, the margin between the between the OL threshold and the predetermined surge threshold for the compressor may be increased. That is, an increase in the determined mass flow loss may indicate that the compressor is not operating as efficiently as possible/as desired, and therefore a risk of fouling may increase. As such, the OL threshold may be decreased and/or the margin between the OL threshold and the surge threshold may be increased to mitigate and/or decrease the risk of fouling based on the operational pressure ratio for the compressor. In this non-limiting example, determining the mass flow loss may allow the compressor to operate at a higher OL threshold during, for example, the beginning life of the gas turbine system and/or when operational conditions for the gas turbine system are ideal, optimal, and/or "new-and-clean system", which in turn increases the power output for the gas turbine system.

It is to be understood that in the flow diagrams shown and described herein, other processes or operations, while not being shown, may be performed. The order of processes may also be rearranged according to various embodiments. For example, although shown as being performed in succession, processes P3 and P4 may be performed simultaneously. Additionally, intermediate processes may be performed between one or more described processes. Furthermore, the processes P1-P6 may be performed continuously in succession and/or process P1 may be performed continuously or intermittently, independent of performing the other processes, to improve operation of a gas turbine system and/or aid in adjusting operational parameters of the gas turbine system, as discussed herein. The flow of processes shown and described herein is not to be construed as being limited to the various embodiments.

Figure 5:
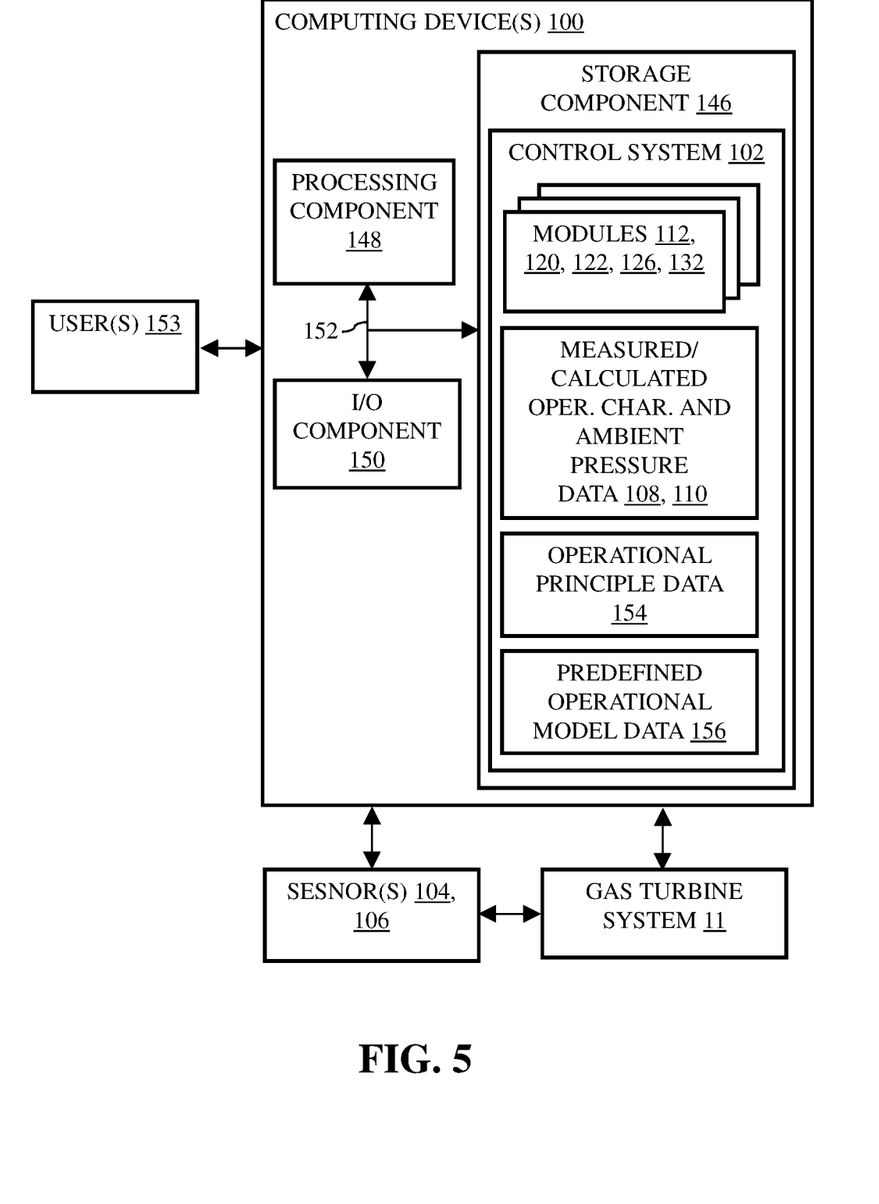
FIG. 5 shows an environment including a control system for adjusting operational parameters of the gas turbine system of FIG. 1, according to embodiments of the disclosure.

FIG. 5 shows an illustrative environment. To this extent, the environment includes computing device(s) 100 that can perform the various process steps described herein for controlling operations and/or adjusting operational parameters of gas turbine system 11. In particular, computing device(s) 100 is shown including control system 102, which enables computing device(s) 100 to control operation and/or adjusting operational parameters of gas turbine system 11 by performing one or more of the process steps of the disclosure.

Computing device(s) 100 is shown including a storage component 146, a processing component 148, an input/output (I/O) component 150, and a bus 152. Further, computing device(s) 100 is shown in communication with gas turbine system 11 and/or sensors 104, 106. As is known in the art, in general, processing component 148 executes computer program code, such as control system 102, that is stored in storage component 146 or an external storage component (not shown). While executing computer program code, processing component 148 can read and/or write data, such as control system 102, to/from storage component 146 and/or I/O component 150. Bus 152 provides a communications link between each of the components in computing device(s) 100. I/O component 150 can comprise any device that enables a user(s) 153 to interact with computing device(s) 100 or any device that enables computing device(s) 100 to communicate with one or more other computing devices. Input/output devices (including but not limited to keyboards, displays, pointing devices, etc.) can be coupled to the system either directly or through intervening I/O controllers.

In any event, computing device(s) 100 can comprise any general purpose computing article of manufacture capable of executing computer program code installed by a user 153 (e.g., a personal computer, server, handheld device, etc.). However, it is understood that computing device(s) 100 and control system 102 are only representative of various possible equivalent computing devices that may perform the various process steps of the disclosure. To this extent, in other embodiments, computing device(s) 100 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computing device(s) 100 is only illustrative of various types of computer infrastructures for implementing the disclosure. For example, in one embodiment, computing device(s) 100 comprises two or more computing devices (e.g., a server cluster) that communicate over any type of wired and/or wireless communications link, such as a network, a shared memory, or the like, to perform the various process steps of the disclosure. When the communications link comprises a network, the network can comprise any combination of one or more types of networks (e.g., the Internet, a wide area network, a local area network, a virtual private network, etc.). Network adapters may also be coupled to the system to enable the data processing system to become coupled to other data processing systems or remote printers or storage devices through intervening private or public networks. Modems, cable modem and Ethernet cards are just a few of the currently available types of network adapters. Regardless, communications between the computing devices may utilize any combination of various types of transmission techniques.

As previously mentioned and discussed herein, control system 102 enables computing infrastructure 102 to control operation and/or adjust operational parameters of gas turbine system 11. To this extent, control system 102 is shown including various modules including, first ARES module 112, model based control module 120, measurement reconciliation and first mass flow (MRFMF) module 122, second ARES module 126, and flow loss module 132, as well as measured/calculated operational characteristic(s) and ambient pressure data 108, 110, operational principle data 154, and predefined operational model data 156. Operation of each of these data is discussed further herein. However, it is understood that some of the various data shown in FIG. 5 can be implemented independently, combined, and/or stored in memory for one or more separate computing devices that are included in computing device(s) 100. Further, it is understood that some of the data and/or functionality may not be implemented, or additional data and/or functionality may be included as part of computing device(s) 100.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As discussed herein, various systems and components are described as "obtaining" data (e.g., obtaining operational characteristic(s) 108, etc.). It is understood that the corresponding data can be obtained using any solution. For example, the corresponding system/component can generate and/or be used to generate the data, retrieve the data from one or more data stores (e.g., a database), receive the data from another system/component, and/or the like. When the data is not generated by the particular system/component, it is understood that another system/component can be implemented apart from the system/component shown, which generates the data and provides it to the system/component and/or stores the data for access by the system/component.

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described herein with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Technical effect is to provide a system for adjusting operational parameters of a gas turbine system to improve operational efficiencies and/or power generation. Specifically, the system may dynamically adjust an operating limit threshold for the gas turbine system based on a mass flow loss of a compressor of the gas turbine system. Adjusting the operating limit threshold may increase or decrease a margin between the operating limit threshold and a surge threshold for the compressor based on the mass flow loss of the compressor.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims herein are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A system, comprising:
   at least one computing device in communication with:
      a gas turbine system including a compressor having an inlet guide vane,
      at least one sensor positioned within or adjacent the gas turbine system, the at least one sensor measuring an operational characteristic of the gas turbine system, and
      a pressure sensor positioned adjacent the gas turbine system for measuring an ambient fluid pressure surrounding the gas turbine system,
   wherein the at least one computing device is configured to adjust operational parameters of the gas turbine system by performing processes including:
      adjusting the measured operational characteristic and the measured ambient fluid pressure based on predetermined measurement uncertainties for the at least one sensor and the pressure sensor, respectively;
      estimating an first mass flow rate for the compressor of the gas turbine system based on the adjusted, measured operational characteristic, and the adjusted, measured ambient fluid pressure surrounding the gas turbine system;
      calculating a second mass flow rate for the compressor of the gas turbine system based on the adjusted, measured operational characteristic, and the adjusted, measured ambient fluid pressure surrounding the gas turbine system;
      determining a mass flow loss between the estimated, first mass flow rate and the calculated, second mass flow rate for the compressor of the gas turbine system; and
      adjusting an operating limit (OL) threshold for the compressor of the gas turbine system based on the mass flow loss, the OL threshold for the compressor being below a predetermined surge threshold for the compressor.

2. The system of claim 1, wherein the at least one computing device is configured to adjust the OL threshold for the compressor of the gas turbine system by performing processes including at least one of:
   adjusting a speed of a shaft for the gas turbine system, at least a portion of the shaft positioned within the compressor, or
   adjusting a position of the inlet guide vane for the compressor of the gas turbine system.

3. The system of claim 1, wherein the at least one computing device is configured to adjust the OL threshold for the compressor of the gas turbine system by performing processes including:
   increasing or decreasing a margin between the OL threshold and the predetermined surge threshold for the compressor based on the determined mass flow loss.

4. The system of claim 1, wherein the at least one computing device is configured to adjust the measured operational characteristic and the measured ambient fluid pressure by performing processes including:
   calculating an operational principle of the gas turbine system using the measured operational characteristic and the measured ambient fluid pressure;
   comparing the calculated operational principle of the gas turbine system to a predefined operational principle of the gas turbine system, the predefined operational principle based on an operational model of the gas turbine system operating under conditions identical to the measured operational characteristic and the measured ambient fluid pressure; and
   adjusting the measured operational characteristic and the measured ambient fluid pressure based on the predetermined measurement uncertainties for the at least one sensor and the pressure sensor, respectively, until the calculated operational principle of the gas turbine system is substantially equal to the predefined operational principle of the gas turbine system.

5. The system of claim 4, wherein the at least one computing device is configured to calculate the second mass flow rate for the compressor of the gas turbine system by performing processes including:
   calculating the second mass flow rate for the compressor based on the predefined operational model of the gas turbine system operating under conditions identical to the adjusted, measured operational characteristic and the adjusted, measured ambient fluid pressure.

6. The system of claim 1, wherein the at least one sensor includes a temperature sensor positioned adjacent or within the compressor, and wherein the operational characteristic includes a compressor inlet temperature.

7. The system of claim 6, wherein the processes performed by the at least one computing device to adjust operational parameters of the gas turbine system further include:
   at least one of measuring or calculating at least one distinct operational characteristic differing from the compressor inlet temperature, the at least one distinct operational characteristic selected from the group consisting of:
      an exhaust temperature of the gas turbine system;
      ambient humidity for the gas turbine system;
      a compressor discharge temperature;
      a compressor discharge pressure;
      a fuel flow rate for the gas turbine system; and
      a power output for the gas turbine system.

8. A computer program product comprising program code, which when executed by at least one computing device, causes the at least one computing device to adjust operational parameters of a gas turbine system including a compressor having an inlet guide vane, by performing processes including:
   adjusting an operational characteristic measured by at least one sensor positioned within or adjacent the gas turbine system and adjusting an ambient fluid pressure measured by a pressure sensor positioned adjacent the gas turbine system, the measured operational characteristic and the measured ambient fluid pressure adjusted based on predetermined measurement uncertainties for the at least one sensor and the pressure sensor, respectively;
   estimating an first mass flow rate for the compressor of the gas turbine system based on the adjusted, measured operational characteristic, and the adjusted, measured ambient fluid pressure surrounding the gas turbine system;

calculating a second mass flow rate for the compressor of the gas turbine system based on the adjusted, measured operational characteristic, and the adjusted, measured ambient fluid pressure surrounding the gas turbine system;

determining a mass flow loss between the estimated, first mass flow rate and the calculated, second mass flow rate for the compressor of the gas turbine system; and adjusting an operating limit (OL) threshold for the compressor of the gas turbine system based on the mass flow loss, the OL threshold for the compressor being below a predetermined surge threshold for the compressor.

9. The computer program product of claim 8, wherein adjusting the OL threshold for the compressor of the gas turbine system further includes at least one of:

adjusting a speed of a shaft for the gas turbine system, at least a portion of the shaft positioned within the compressor, or adjusting a position of the inlet guide vane for the compressor of the gas turbine system.

10. The computer program product of claim 8, wherein adjusting the OL threshold for the compressor of the gas turbine system further includes:

increasing or decreasing a margin between the OL threshold and the predetermined surge threshold for the compressor based on the determined mass flow loss.

11. The computer program product of claim 8, wherein adjusting the measured operational characteristic and the measured ambient fluid pressure further includes:

calculating an operational principle of the gas turbine system using the measured operational characteristic and the measured ambient fluid pressure;

comparing the calculated operational principle of the gas turbine system to a predefined operational principle of the gas turbine system, the predefined operational principle based on an operational model of the gas turbine system operating under conditions identical to the measured operational characteristic and the measured ambient fluid pressure; and adjusting the measured operational characteristic and the measured ambient fluid pressure based on the predetermined measurement uncertainties for the at least one sensor and the pressure sensor, respectively, until the calculated operational principle of the gas turbine system is substantially equal to the predefined operational principle of the gas turbine system.

12. The computer program product of claim 11, wherein calculating the second mass flow rate for the compressor of the gas turbine system further includes:

calculating the second mass flow rate for the compressor based on the predefined operational model of the gas turbine system operating under conditions identical to the adjusted, measured operational characteristic and the adjusted, measured ambient fluid pressure.

13. The computer program product of claim 8, wherein the at least one sensor includes a temperature sensor positioned adjacent or within the compressor, and wherein the operational characteristic includes a compressor inlet temperature.

14. The computer program product of claim 13, wherein the program code causes the at least one computing device to adjust the operational parameters of a gas turbine system by performing further processes including:

at least one of measuring or calculating at least one distinct operational characteristic differing from the compressor inlet temperature, the at least one distinct operational characteristic selected from the group consisting of:

an exhaust temperature of the gas turbine system;
ambient humidity for the gas turbine system;
a compressor discharge temperature;
a compressor discharge pressure;
a fuel flow rate for the gas turbine system; and
a power output for the gas turbine system.

15. A method for adjust operational parameters of a gas turbine system including a compressor having an inlet guide vane, the method comprising:

adjusting an operational characteristic measured by at least one sensor positioned within or adjacent the gas turbine system and adjusting an ambient fluid pressure measured by a pressure sensor positioned adjacent the gas turbine system, the measured operational characteristic and the measured ambient fluid pressure adjusted based on predetermined measurement uncertainties for the at least one sensor and the pressure sensor, respectively;

estimating an first mass flow rate for the compressor of the gas turbine system based on the adjusted, measured operational characteristic, and the adjusted, measured ambient fluid pressure surrounding the gas turbine system;

calculating a second mass flow rate for the compressor of the gas turbine system based on the adjusted, measured operational characteristic, and the adjusted, measured ambient fluid pressure surrounding the gas turbine system;

determining a mass flow loss between the estimated, first mass flow rate and the calculated, second mass flow rate for the compressor of the gas turbine system; and adjusting an operating limit (OL) threshold for the compressor of the gas turbine system based on the mass flow loss, the OL threshold for the compressor being below a predetermined surge threshold for the compressor.

16. The method of claim 15, wherein adjusting the OL threshold for the compressor of the gas turbine system further includes at least one of:

adjusting a speed of a shaft for the gas turbine system, at least a portion of the shaft positioned within the compressor, or adjusting a position of the inlet guide vane for the compressor of the gas turbine system.

17. The method of claim 15, wherein adjusting the OL threshold for the compressor of the gas turbine system further includes:

increasing or decreasing a margin between the OL threshold and the predetermined surge threshold for the compressor based on the determined mass flow loss.

18. The method of claim 15, wherein adjusting the measured operational characteristic and the measured ambient fluid pressure further includes:

calculating an operational principle of the gas turbine system using the measured operational characteristic and the measured ambient fluid pressure;

comparing the calculated operational principle of the gas turbine system to a predefined operational principle of the gas turbine system, the predefined operational principle based on an operational model of the gas turbine system operating under conditions identical to the measured operational characteristic and the measured ambient fluid pressure; and adjusting the measured operational characteristic and the measured ambient fluid pressure based on the predetermined measurement uncertainties for the at least one sensor and the pressure sensor, respectively, until the calculated operational principle of the gas turbine system is substantially equal to the predefined operational principle of the gas turbine system.

19. The method of claim 18, wherein calculating the second mass flow rate for the compressor of the gas turbine system further includes:

calculating the second mass flow rate for the compressor based on the predefined operational model of the gas turbine system operating under conditions identical to the adjusted, measured operational characteristic and the adjusted, measured ambient fluid pressure.

20. The method of claim 15, further comprising:

at least one of measuring or calculating at least one distinct operational characteristic differing from the compressor inlet temperature, the at least one distinct operational characteristic selected from the group consisting of:
an exhaust temperature of the gas turbine system;
ambient humidity for the gas turbine system;
a compressor discharge temperature;
a compressor discharge pressure;
a fuel flow rate for the gas turbine system; and
a power output for the gas turbine system,
wherein the at least one sensor includes a temperature sensor positioned adjacent or within the compressor, and wherein the operational characteristic includes a compressor inlet temperature.

\* \* \* \* \*